United States Patent
Rubehn

(10) Patent No.: US 10,139,255 B2
(45) Date of Patent: Nov. 27, 2018

(54) METHOD FOR INCREASING THE RELIABILITY OF TRANSDUCERS

(71) Applicant: Micronas GmbH, Freiburg (DE)

(72) Inventor: Thilo Rubehn, Gundelfingen (DE)

(73) Assignee: TDK-Micronas GmbH, Freiburg (DE)

( * ) Notice: Subject to any disclaimer, the term of this patent is extended or adjusted under 35 U.S.C. 154(b) by 445 days.

(21) Appl. No.: 14/941,112

(22) Filed: Nov. 13, 2015

(65) Prior Publication Data
US 2016/0161305 A1    Jun. 9, 2016

(30) Foreign Application Priority Data
Nov. 13, 2014 (DE) .................. 10 2014 016 711

(51) Int. Cl.
*G01D 18/00* (2006.01)
*G08C 25/00* (2006.01)
*H04Q 9/00* (2006.01)

(52) U.S. Cl.
CPC ............ *G01D 18/00* (2013.01); *G08C 25/00* (2013.01); *H04Q 9/00* (2013.01)

(58) Field of Classification Search
None
See application file for complete search history.

(56) References Cited

U.S. PATENT DOCUMENTS

| | | |
|---|---|---|
| 8,805,638 B2 | 8/2014 | Morath |
| 2015/0022925 A1* | 1/2015 | D'Abramo ............ G01R 31/026 361/86 |
| 2016/0135298 A1* | 5/2016 | Rubehn .................... H05K 1/18 361/783 |

FOREIGN PATENT DOCUMENTS

| | | |
|---|---|---|
| DE | 20 2009 017 430 U1 | 6/2011 |
| DE | 10 2011 075 679 A1 | 11/2012 |
| DE | 10 2014 011 783 B3 | 4/2015 |

* cited by examiner

*Primary Examiner* — Roy Y Yi
(74) *Attorney, Agent, or Firm* — Muncy, Geissler, Olds & Lowe, P.C.

(57) ABSTRACT

A method for increasing a reliability of transducers having a first IC and a second IC, each has a sensor and a signal output and a signal input and a comparator, and a sensor signal generated as a function of the physical quantity sensed by the relevant sensor is applied to the respective signal outputs. The signal outputs are each connected to a first input of the comparator, and the signal inputs are each connected to a second input of the comparator. The two ICs can be integrated into a common IC package, and the signal output of the first IC is connected to the first input of the comparator on the first IC and to the signal input of the second IC and to a first contact area passing through the IC package.

15 Claims, 4 Drawing Sheets

METHOD FOR INCREASING THE RELIABILITY OF TRANSDUCERS

This nonprovisional application claims priority under 35 U.S.C. § 119(a) to German Patent Application No. 10 2014 016 711.9, which was filed in Germany on Nov. 13, 2014, and which is herein incorporated by reference.

BACKGROUND OF THE INVENTION

Field of the Invention

The invention relates to a method for increasing the reliability of transducers.

Description of the Background Art

A sensor housing having two sensors and a first integrated circuit and a second integrated circuit is known from DE 20 2009 017 430 U1, which corresponds to U.S. Pat. No. 8,805,638. Furthermore, an arrangement with two sensors is known from DE 10 2011 075 679 A1. In addition, the two documents each disclose a method for increasing the reliability of transducers, in particular of sensors.

SUMMARY OF THE INVENTION

It is therefore an object of the invention to provide a method for increasing the reliability of transducers that advances the state of the art.

According to an exemplary embodiment of the invention, a method for increasing the reliability of transducers is provided, having a first IC and a second IC, wherein the two ICs have substantially or exactly the same monolithically integrated circuit functions, each with a sensor and a signal output and a signal input and a comparator, and a sensor signal generated as a function of the physical quantity sensed by the relevant sensor is applied to the respective signal outputs, and the signal outputs are each connected to a first input of the comparator, and the signal inputs are each connected to a second input of the comparator, and the two ICs are integrated into a common IC package, and the signal output of the first IC is connected to the first input of the comparator on the first IC and to the signal input of the second IC and to a first contact area passing through the IC package, and the signal output of the second IC is connected to the first input of the comparator on the second IC and to the signal input of the first IC, and the output signal of the first IC is compared on the second IC with the output signal of the second IC, and starting at a predefined discrepancy between the two output signals, the output signal at the signal output of the second IC is altered such that the output signal no longer corresponds to the sensor signal of the first IC, and the output signal of the second IC is compared on the first IC with the output signal of the first IC, and starting at a predefined discrepancy between the two output signals, the output signal at the signal output of the first IC is altered such that the output signal no longer corresponds to the sensor signal of the second IC.

The contact area can be designed as part of a contact element, which can also be referred to as a pin. In addition, the ICs can have so-called bonding areas, also referred to as pads, on the applicable surface at the applicable signal outputs and the applicable signal inputs. The relevant bonding areas can be connected using bond wires in order to connect the signal outputs and the signal inputs to one another. In addition, the two ICs, can also be referred to as dice, are arranged side-by-side or stacked, and are coated with a plastic in a molding process to form a package.

An advantage of the method is that the fault tolerance of sensors implemented as transducers can be improved in a simple and cost-effective manner by means of a redundant arrangement. To this end, two ICs of the same type can be arranged within a single circuit package. As a result of the advantageous interconnection, however, a malfunction of the transducers, which is to say the sensors, can easily be detected by a comparison of the two sensor signals carried out within the package.

It is advantageous if solely the signal output of the first IC is routed to the outside, which is to say outside of the IC package. In other words, the signal output of the second IC is connected only within the IC package in a first alternative, or is connected to a second contact area that passes through the IC package in a second alternative.

A difference in the circuitry between the two ICs, wherein the two ICs can have identical circuit functions or nearly the same circuit functions, includes, in the first alternative, in that only the output signal of the first IC is routed to the outside, i.e., only a single pin is allocated to the total of four signal-carrying lines. A redundant arrangement that monitors itself and is cost-effective is advantageously created in this way. In a second alternative, the output signal of the second IC is connected to a second contact area that preferably passes through the IC package.

The method is especially advantageous when analog signals are applied to both of the signal outputs. Advantageously, the two signal outputs are implemented as voltage outputs.

In an embodiment, a useful band can be provided, wherein, starting at the predefined discrepancy, the output signal at the signal output of the first IC is altered such that the output signal lies outside the useful band. An error band can be located on each side of the useful band, or in other words, for the useful band to be located between two error bands.

In an embodiment, the comparison of the two output signals on the first IC and the comparison of the two output signals on the second IC can each be performed by a comparator.

In addition, it is advantageous if, on the second IC, starting at the predefined discrepancy, the output signal of the second signal output can be placed in an error band, and as a result, the output signal of the first signal output can be placed in the error band, and subsequently the sensor signal is again output at the signal output of the second IC.

In an embodiment, after an alteration of the output signal, the sensor signal is again output at the signal output after a predetermined time with the altered output signal.

It is also advantageous if the alteration of the two output signals is carried out by a change in the gain of an output amplifier connected to the relevant signal output.

In an embodiment, one control unit can be provided on each of the two ICs, wherein the gain of the applicable output amplifier is altered by the applicable control unit in order to alter the applicable output signal as a function of the size of the discrepancy and the duration of the discrepancy. In particular, the applicable output amplifier can be switched to a different operating mode by the control unit. In addition, for both ICs, the output signal of the applicable output amplifier can be modulated or switched off by the control unit as a function of the size and duration of the discrepancy.

In an embodiment, the first contact area and/or the second contact area are each connected outside of the IC package to one input of a receiver unit. As a result, the receiver unit obtains additional information. The operating mode can be detected by the receiver unit.

The first IC and the second IC can be arranged side-by-side on a common substrate or stacked on a common substrate, which is to say one atop the other, within the IC package. The sensors can be identical, i.e., for them to measure the same physical quantity, preferably with the same sensitivity. Both sensors can be implemented as magnetic field sensors, in particular as Hall effect elements, most preferably as Hall plates. In another embodiment, even though the two sensors measure the same physical quantity, for example the magnetic field, they have different sensitivities. For example, very weak magnetic fields can be measured by a GMR sensor, and stronger magnetic fields can be measured by a Hall effect sensor.

In an embodiment, in each of the ICs, the comparator can have a first input and a second input, and the applicable signal output of the applicable circuit of the applicable IC is connected to the first input of the associated comparator, and the respective signal input of each of the two circuits is connected to the applicable second input of the applicable comparator by means of an applicable trace segment.

In other words, the comparator of the first IC compares the output signal of the second IC with the output signal of the first IC. Nor is anything different done with the output signal of the second IC, in that the comparator of the second IC compares the output signal of the second IC with the output signal of the first IC.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
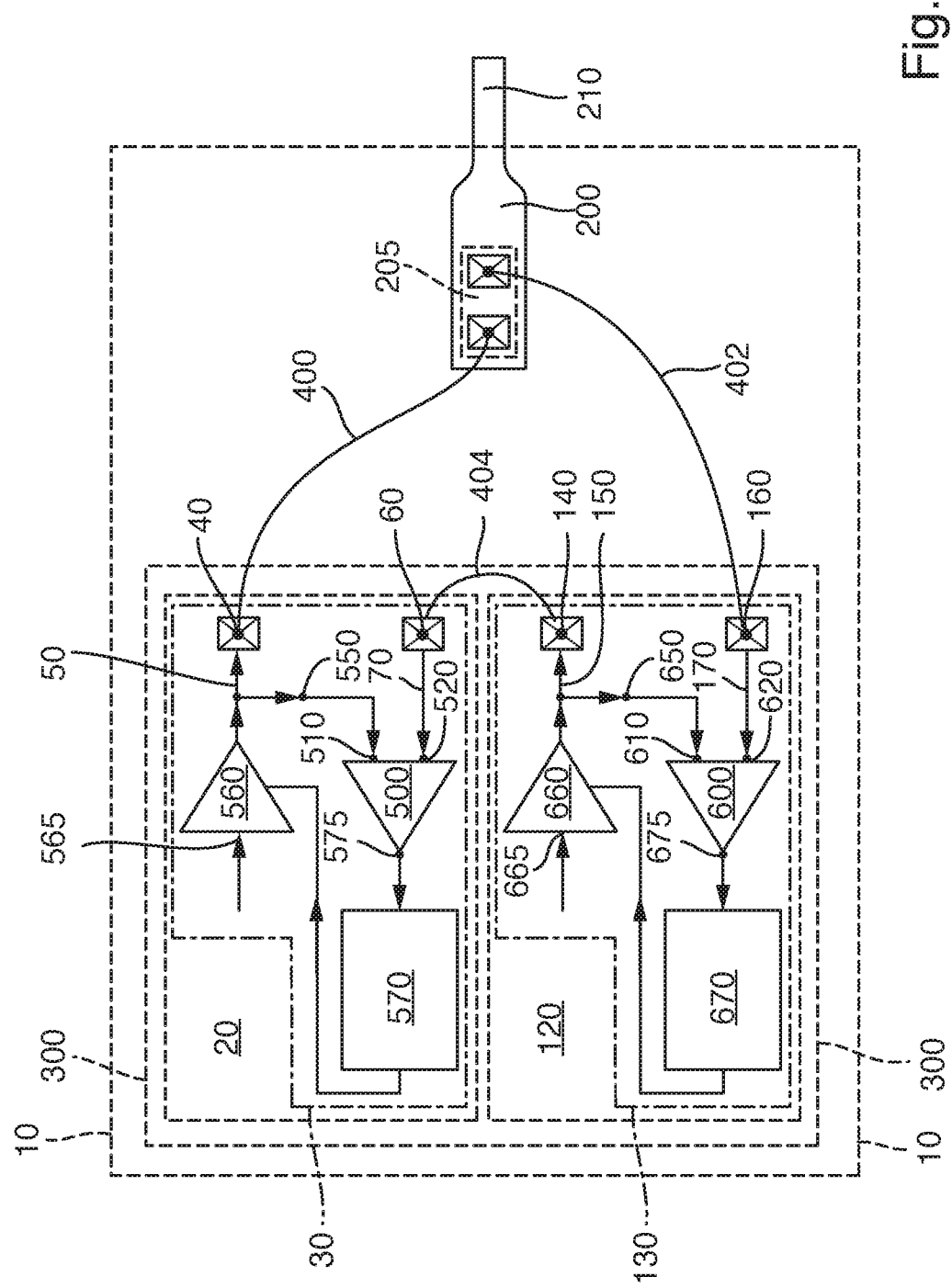
FIG. 1 shows a top view of an embodiment according to the invention.

The illustration in FIG. 1 shows a top view of a first embodiment with a circuit package 10, which is also referred to as an IC package, having a first semiconductor body 20 with a first monolithically integrated circuit 30, wherein the first circuit 30 comprises a first signal output 50 connected to a bonding area 40, and a first signal input 70 connected to a bonding area 60. The entire arrangement is also referred to as the first IC.

In addition, the circuit package 10 includes a second semiconductor body 120 with a second monolithically integrated circuit 130, wherein the second circuit 130 comprises a second signal output 150 connected to a bonding area 140, and a second signal input 170 connected to a bonding area 160. The entire arrangement is also referred to as the second IC. The semiconductor bodies 20 and 120 both have the same semiconductor components and are redundant with respect to one another.

The circuit package 10 includes a first contact element 200 with at least one bonding area 205, and includes a substrate element 300, wherein the bonding area 40 of the first signal output 50 is connected by means of a bond wire 400, and the bonding area 160 of the second signal input 170 is connected by means of a bond wire 402, to the contact element 200 through the bonding area 205 so that an electrical connection exists between the first signal output 50 and the second signal input 170. A part 210 of the first contact element 200 passes through the circuit package 10.

In the present case, the first semiconductor body 20 and the second semiconductor body 120 are arranged next to one another on the common substrate 300. The first semiconductor body 20 and the second semiconductor body 120 each have a Hall effect sensor that is not shown.

The bonding area 140 of the second signal output 150 is connected by a bond wire 404 to the bonding area 60 of the first signal input 70. In other words, the second signal output 150 and the first signal input 70 are connected exclusively within the circuit package 10.

The first circuit 30 includes a comparator 500 with a first input 510 and a second input 520. The first signal output 50 is connected to the first input 510 of the comparator 500. In addition, the first signal input 70 is connected to the second input 520 of the comparator 500 by means of a trace segment 550.

The first signal output 50 is driven by means of an operational amplifier 560 implemented in the first circuit 30 so that an analog signal is present at the first signal output 50. The signal of the Hall effect sensor integrated with the first circuit 30 preferably is present at an input 565 of the operational amplifier 560. It should be noted that the operational amplifier 560 is implemented as an output amplifier.

The comparator 500 of the first circuit 30 has an output 575 connected to a control unit 570. The control unit 570 of the first circuit 30 is connected to the operational amplifier 560. In this way, the control unit 570 can control the operational amplifier 560 as a function of the result of the comparison of the comparator 500 and the duration of the discrepancy.

The second circuit 130 includes a comparator 600 with a first input 610 and a second input 620. The second signal output 150 is connected to the first input 610 of the comparator 600. In addition, the second signal input 170 is connected to the second input 620 of the comparator 600 by means of a trace segment 650.

The second signal output 150 is driven by means of an operational amplifier 660 implemented in the second circuit 130 so that an analog signal is present at the second signal output 150. The signal of the Hall effect sensor integrated with the second circuit 130 preferably is present at an input 665 of the operational amplifier 660. It should be noted that the operational amplifier 660 is implemented as an output amplifier.

The comparator 600 of the second circuit 130 has an output 675 connected to a control unit 670. The control unit 670 of the second circuit 130 is connected to the operational amplifier 660. In this way, the control unit 670 can control the operational amplifier 660 as a function of the result of the comparison of the discrepancy of the comparator 600 and the duration of the discrepancy.

Figure 2:
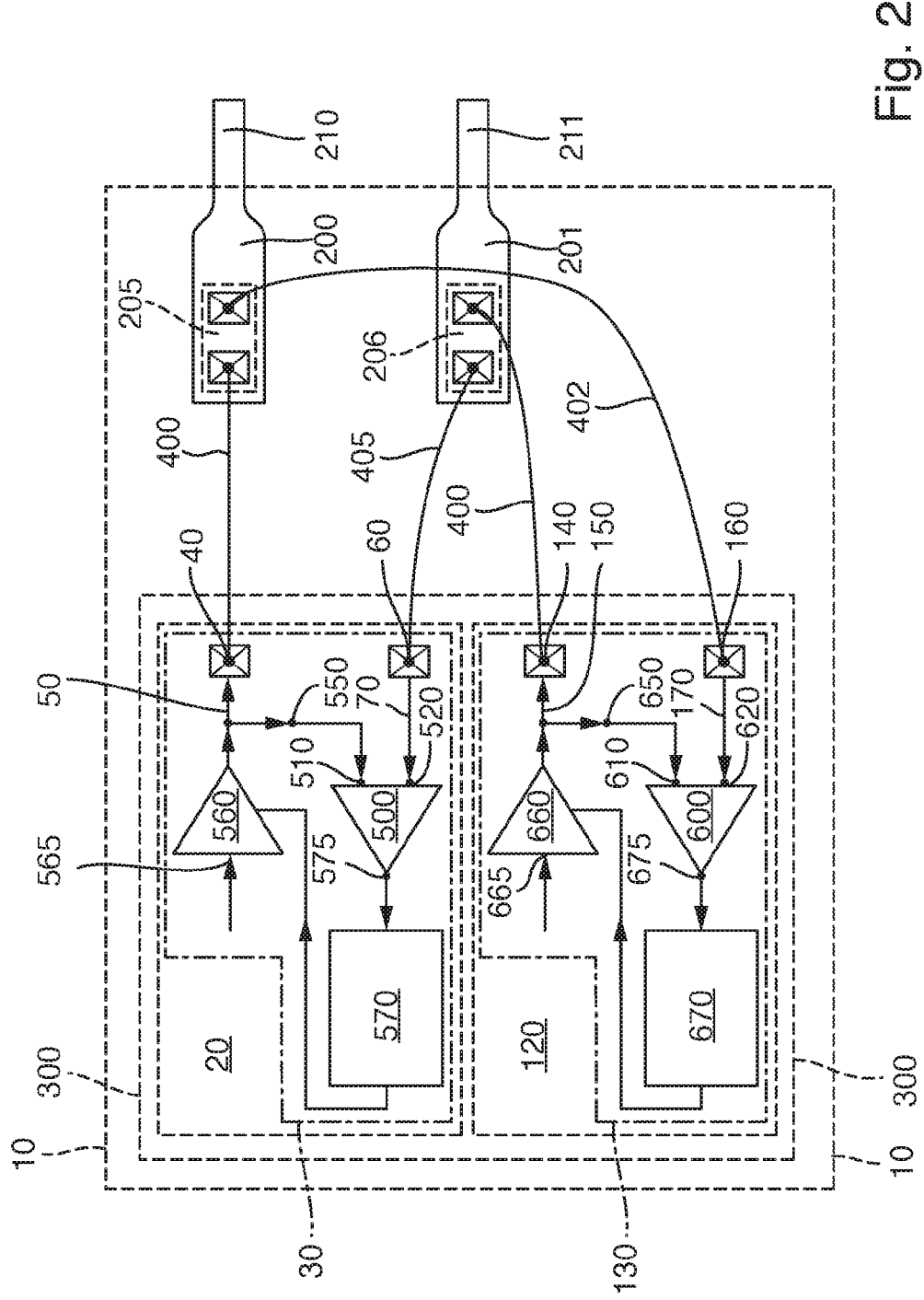
FIG. 2 shows a top view of an embodiment according to the invention.

FIG. 2 shows a top view of a second embodiment with a circuit package 10. Only the differences from the embodiment shown in the illustration in FIG. 1 are explained below. The bonding area 140 of the second signal output 150 is connected by means of a bond wire 405 to the second contact element 201 through the bonding area 206. In addition, the first signal input 70 is connected by a bond wire 406 to the second contact element 201 through the bonding area 206 so that an electrical connection exists between the second signal output 150 and the first signal input 70. A part 211 of the second contact element 201 passes through the circuit package 10. In an embodiment that is not shown, the entire second contact element is implemented exclusively within the circuit package 10.

Figure 3:
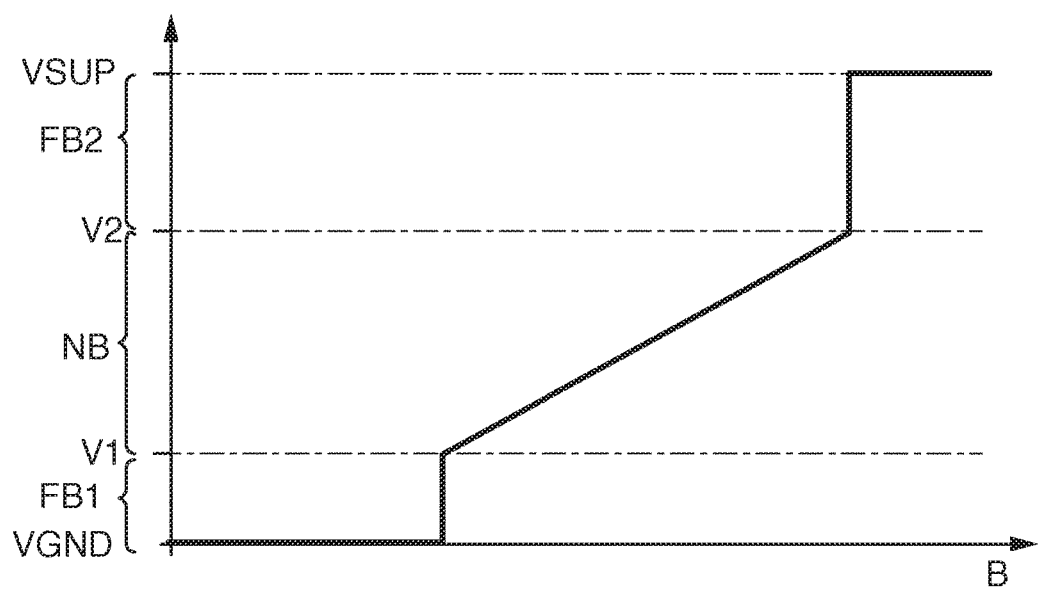
FIG. 3 shows a useful band enclosed by one error band on each side.

The illustration in FIG. 3 shows a useful band enclosed by one error band on each side. The voltage value of the output signal is plotted along the y-axis here, and the magnetic field, as the measured physical quantity, is plotted along the x-axis.

The voltage value of the output signal shown can vary between a reference potential VGND, preferably the ground potential, and a supply voltage VSUP. A first error band FB1 is implemented in a first region between the ground potential and a first voltage value V1. A useful band NB is located from the first voltage value V1 to a second voltage value V2. A second error band FB2 is implemented from the second voltage value V2 to the supply voltage. As soon as the output signal is below V1, the output signal is pulled to the reference potential VGND, and as soon as the output signal is above V2, the output signal is pulled to the supply voltage VSUP.

Figure 4:
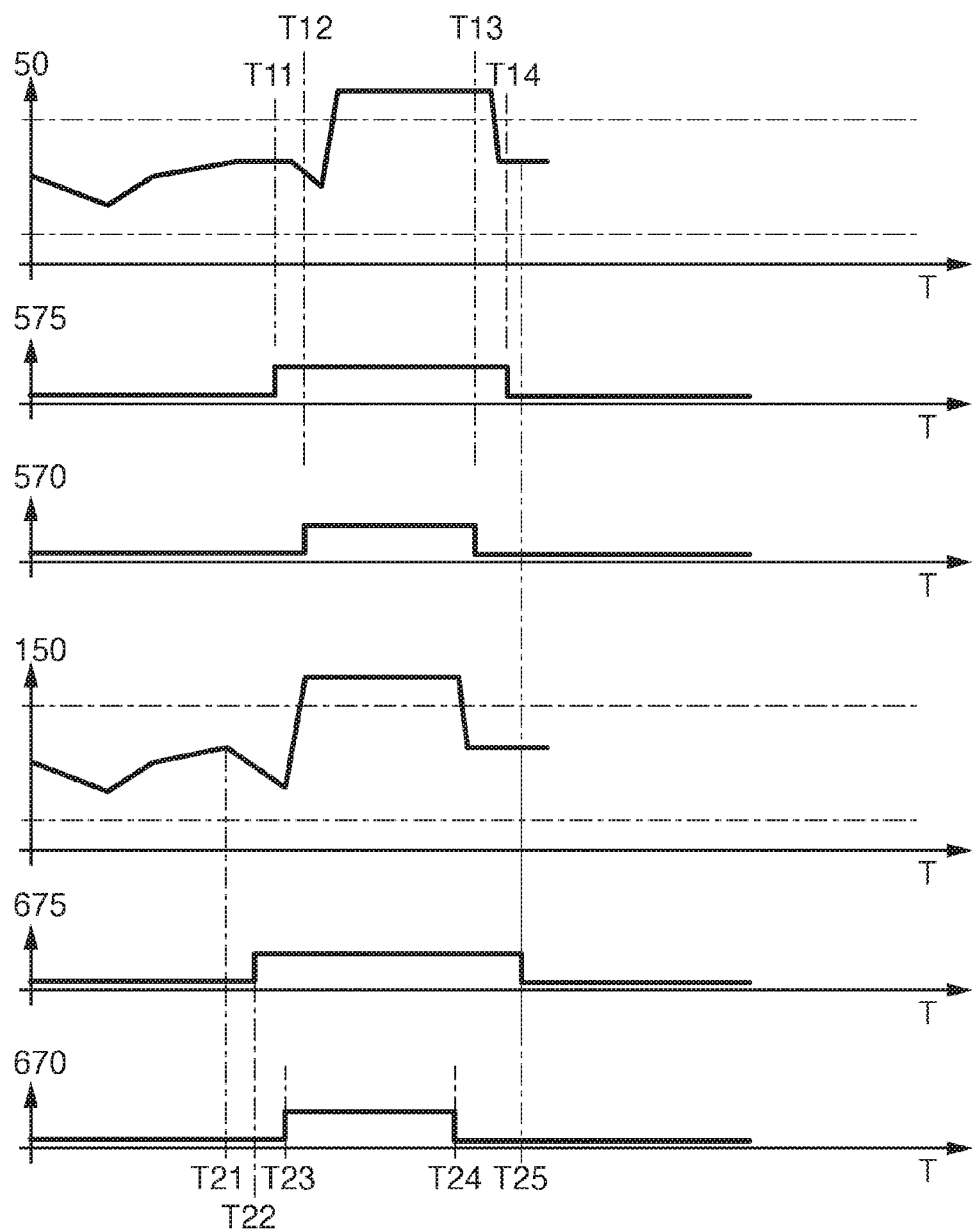
FIG. 4 shows a time sequence with discovery of a fault and return to normal function.

The illustration in FIG. 4 shows the time sequence with discovery of a fault and return to normal function at selected circuit points for both ICs. The voltage values of the output signal present at the selected circuit points are plotted along the y-axis here, and the time T is plotted along the x-axis.

Until the time T21, the arrangement is in normal operation. Starting at T21, the output 150 is faulty. The output 150 is detected by the comparator 600 at T22, and at T23 a sequence control 670 drives the output 660 into one of the two error bands FB1 and FB2. At T11, the comparator 500 discovers the fault. At T12, the sequence control 570 drives the output 560 into one of the two error bands FB1 and FB2.

At T24, the sequence control 670 drives the output 660 back into the useful band NB. After this, the sequence control 570 also drives the output 560 back into the useful band NB at T13. Starting at T14, the comparator 500 no longer detects a fault. Comparator 600 likewise no longer detects a fault starting at T25. Normal function of the circuit is restored.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for increasing a reliability of transducers having a first integrated circuit (IC) and a second integrated circuit (IC), each of the first IC and second IC has a sensor and a signal output and a signal input and a comparator, the method comprising:
    applying a sensor signal generated as a function of the physical quantity sensed by the sensor of each of the first IC and second IC to the respective signal output;
    connecting the signal outputs to a first input of each comparator of the first IC and second IC, the signal inputs each being connected to a second input of each comparator of the first IC and second IC, and the first IC and second IC are integrated into a common IC package;
    connecting the signal output of the first IC to the first input of the comparator on the first IC and to the signal input of the second IC and to a first contact area passing through the common IC package;
    connecting the signal output of the second IC to the first input of the comparator on the second IC and to the signal input of the first IC, so that the output signal of the first IC is compared on the second IC with the output signal of the second IC, and the output signal of the second IC is compared on the first IC with the output signal of the first IC;
    altering, starting at a predefined discrepancy between the two output signals, the output signal at the signal output of the second IC such that the output signal no longer corresponds to the sensor signal of the first IC;
    comparing the output signal of the second IC on the first IC with the output signal of the first IC; and
    altering, starting at a predefined discrepancy between the two output signals, the output signal at the signal output of the first IC such that the output signal no longer corresponds to the sensor signal of the second IC,
    wherein the second IC measures a same physical quantity as the first IC, and
    wherein the first IC monitors and compares signal measurements of the same physical quantity with the second IC.

2. The method for increasing the reliability according to claim 1, wherein the signal output of the second IC is connected only within the common IC package or is connected to a second contact area that passes through the common IC package.

3. The method for increasing the reliability according to claim 1, wherein analog output signals are applied to both of the signal outputs.

4. The method for increasing the reliability according to claim 1, wherein a useful band is provided, and starting at the predefined discrepancy, the output signal at the signal output of the first IC is altered such that the output signal lies outside the useful band.

5. The method for increasing the reliability according to claim 1, wherein the comparison of the two output signals on the first IC and the comparison of the two output signals on the second IC are each performed by respective comparators on each of the first IC and the second IC.

6. The method for increasing the reliability according to claim 1, wherein, on the second IC, starting at the predefined discrepancy, the output signal of the second signal output is placed in an error band, and as a result, the output signal of the first signal output is placed in the error band, and subsequently the sensor signal is again output at the signal output of the second IC.

7. A method for increasing a reliability of transducers having a first integrated circuit (IC) and a second integrated circuit (IC), the first and second ICs have substantially the same or exactly the same monolithically integrated circuit functions, each of the first IC and second IC has a sensor and a signal output and a signal input and a comparator, the method comprising:
    applying a sensor signal generated as a function of the physical quantity sensed by the relevant sensor to the respective signal outputs;
    connecting the signal outputs to a first input of the comparator, the signal inputs each being connected to a second input of the comparator and the first IC and the second IC are integrated into a common IC package;

connecting the signal output of the first IC to the first input of the comparator on the first IC and to the signal input of the second IC and to a first contact area passing through the IC package;

connecting the signal output of the second IC to the first input of the comparator on the second IC and to the signal input of the first IC, so that the output signal of the first IC is compared on the second IC with the output signal of the second IC, and the output signal of the second IC is compared on the first IC with the output signal of the first IC;

altering, starting at a predefined discrepancy between the two output signals, the output signal at the signal output of the second IC such that the output signal no longer corresponds to the sensor signal of the first IC;

comparing the output signal of the second IC on the first IC with the output signal of the first IC; and altering, starting at a predefined discrepancy between the two output signals, the output signal at the signal output of the first IC such that the output signal no longer corresponds to the sensor signal of the second IC, wherein, after an alteration of the output signal, the sensor signal is again output at the applicable signal output after a predetermined time with the altered output signal.

8. The method for increasing the reliability according to claim 1, wherein the alteration of the two output signals is carried out by a change in the gain of an output amplifier connected to the relevant signal output.

9. A method for increasing a reliability of transducers having a first integrated circuit (IC) and a second integrated circuit (IC), the first and second ICs have substantially the same or exactly the same monolithically integrated circuit functions, each of the first IC and second IC has a sensor and a signal output and a signal input and a comparator, the method comprising:

applying a sensor signal generated as a function of the physical quantity sensed by the relevant sensor to the respective signal outputs;

connecting the signal outputs to a first input of the comparator, the signal inputs each being connected to a second input of the comparator and the first IC and the second IC are integrated into a common IC package;

connecting the signal output of the first IC to the first input of the comparator on the first IC and to the signal input of the second IC and to a first contact area passing through the IC package;

connecting the signal output of the second IC to the first input of the comparator on the second IC and to the signal input of the first IC, so that the output signal of the first IC is compared on the second IC with the output signal of the second IC, and the output signal of the second IC is compared on the first IC with the output signal of the first IC;

altering, starting at a predefined discrepancy between the two output signals, the output signal at the signal output of the second IC such that the output signal no longer corresponds to the sensor signal of the first IC;

comparing the output signal of the second IC on the first IC with the output signal of the first IC; and altering, starting at a predefined discrepancy between the two output signals, the output signal at the signal output of the first IC such that the output signal no longer corresponds to the sensor signal of the second IC, wherein one control unit is provided on each of the first IC and the second IC, and a gain of the applicable output amplifier is altered by the control unit to alter the applicable output signal as a function of a size and a duration of the discrepancy.

10. The method for increasing the reliability according to claim 9, wherein the applicable output amplifier is switched to a different operating mode by each control unit.

11. The method for increasing the reliability according to claim 9, wherein, on both the first IC and the second IC, the output signal of the applicable output amplifier is modulated or switched off by each control unit as a function of the size and duration of the discrepancy.

12. A method for increasing a reliability of transducers having a first integrated circuit (IC) and a second integrated circuit (IC), the first and second ICs have substantially the same or exactly the same monolithically integrated circuit functions, each of the first IC and second IC has a sensor and a signal output and a signal input and a comparator, the method comprising:

applying a sensor signal generated as a function of the physical quantity sensed by the relevant sensor to the respective signal outputs;

connecting the signal outputs to a first input of the comparator, the signal inputs each being connected to a second input of the comparator and the first IC and the second IC are integrated into a common IC package;

connecting the signal output of the first IC to the first input of the comparator on the first IC and to the signal input of the second IC and to a first contact area passing through the IC package;

connecting the signal output of the second IC to the first input of the comparator on the second IC and to the signal input of the first IC, so that the output signal of the first IC is compared on the second IC with the output signal of the second IC, and the output signal of the second IC is compared on the first IC with the output signal of the first IC;

altering, starting at a predefined discrepancy between the two output signals, the output signal at the signal output of the second IC such that the output signal no longer corresponds to the sensor signal of the first IC;

comparing the output signal of the second IC on the first IC with the output signal of the first IC; and altering, starting at a predefined discrepancy between the two output signals, the output signal at the signal output of the first IC such that the output signal no longer corresponds to the sensor signal of the second IC, wherein the first contact area and/or a second contact area are each connected outside of the common IC package to one input of a receiver unit.

13. The method for increasing the reliability according to claim 12, wherein an operating mode is detected by the receiver unit.

14. The method for increasing the reliability according to claim 1, wherein the same physical quantity is a magnetic field.

15. The method for increasing the reliability according to claim 1, wherein the sensor in each of the first IC and the second IC are Hall sensors.

* * * * *